Dec. 20, 1960         H. H. P. LEMMERMAN         2,965,763
                    POSITION INDICATING DEVICE
Original Filed Aug. 30, 1951                 3 Sheets-Sheet 1

Inventor:
Harold H. P. Lemmerman,
by  *Clarke H. Mott*
His Attorney.

Inventor:
Harold H.P. Lemmerman,
by *(signature)*
His Attorney.

United States Patent Office 2,965,763
Patented Dec. 20, 1960

---

2,965,763
POSITION INDICATING DEVICE

Harold H. P. Lemmerman, Schenectady, N.Y., assignor to General Electric Company, a corporation of New York Continuation of application Ser. No. 244,388, Aug. 30, 1951. This application Sept. 23, 1957, Ser. No. 685,749

10 Claims. (Cl. 250—203)

This invention relates to position indicating devices, and more particularly to such devices for use with gyroscopes.

In aircraft application, a plurality of gyroscopes are ordinarily used to indicate the displacement of the aircraft around its bank, turn, and pitch axes, a horizontal or directional gyro being used to indicate the displacement from the turn axis and a vertical gyro being used to indicate the displacement from the bank and pitch axes. In addition, a spring loaded yaw rate gyro is often employed to indicate the rate-of-turn of the aircraft around the vertical axis. Besides being merely indicators, these various gyros may also be used as the actuating or controlling devices for an automatic pilot system. In any case, it is very desirable that the means employed to ascertain the position of the gyros relative to the various axes of the aircraft be such that they determine and indicate the gyro positions without applying any appreciable forces to the gyros themselves. Otherwise, the position indicating devices themselves will introduce slight errors into the instantaneous positions of the gyros. Unfortunately, however, the magnetic pick-offs and potentiometers commonly used for that purpose do not meet this criterion, for they tend to create a drag on the movement of the gyro, and the drag, of course, tends to introduce slight errors into the results obtained.

It is an object of my invention, therefore, to provide a new and improved device for indicating the position of an object without applying any force to the object.

It is a further object of my invention to provide a new and improved position indicating device for use with gyroscopes.

It is another object of my invention to provide a new and improved position indicating device employing a light beam as the position sensing means.

It is another object of my invention to provide new and improved light producing means for use in position indicating devices employing a light beam as the position sensing means.

It is another object of my invention to provide new and improved photoelectric means for use in a position indicating device employing a light beam as the position sensing means.

It is another object of my invention to provide a new and improved position indicating device which produces two electrical signals, one indicative of the displacement of the measured object relative to one axis and the other indicative of the displacement of the object relative to an axis perpendicular to the first axis.

My invention also has as its object the provision of a position indicating device which may be adapted to indicate the positions of lines and contours relative to a pair of perpendicular axes.

In carrying out my invention in one form thereof, I provide a positioning indicating device which comprises a photoelectric cell having a light sensitive surface and means including a movable light beam for successively and cyclically actuating displaced areas of the light sensitive surface lying in an orbital path to produce electrical signals. The movable light beam is controlled by the object whose position is to be indicated and when the object is in a predetermined neutral position, the relative sizes of the displaced areas in a single cycle are substantially fixed. The magnitude of any signal is dependent upon the size of the actuated area causing it and thus when the object is in its neutral position the magnitudes of the signals in a single cycle are also substantially fixed. However, when the object moves away from the neutral position so as to cause movement of the light beam, the relative sizes of the displaced areas in a single cycle and thereby the magnitudes of the associated signals are varied in accordance with the movement. Thus, the output of the photocell contains an alternating component which has a phase angle dependent upon the direction of displacement of the object and an amplitude dependent upon the magnitude of the displacement. The intelligence contained in this A.C. component may be utilized in various way. For example, the A.C. component may be fed through suitable phase discriminating circuits to obtain a pair of D.C. signals, one of which is indicative of the displacement of the object relative to one predetermined axis and the other of which is indicative of the displacement of the object relative to an axis perpendicular to the first axis.

The features of this invention which are believed to be novel and patentable are pointed out with particularity in the appended claims. The invention itself, however, both as to organization and mode of operation, together with additional objects and advantages thereof, may be best understood by reference to the following description to be taken in conjunction with the accompanying drawing in which:

Figure 1:
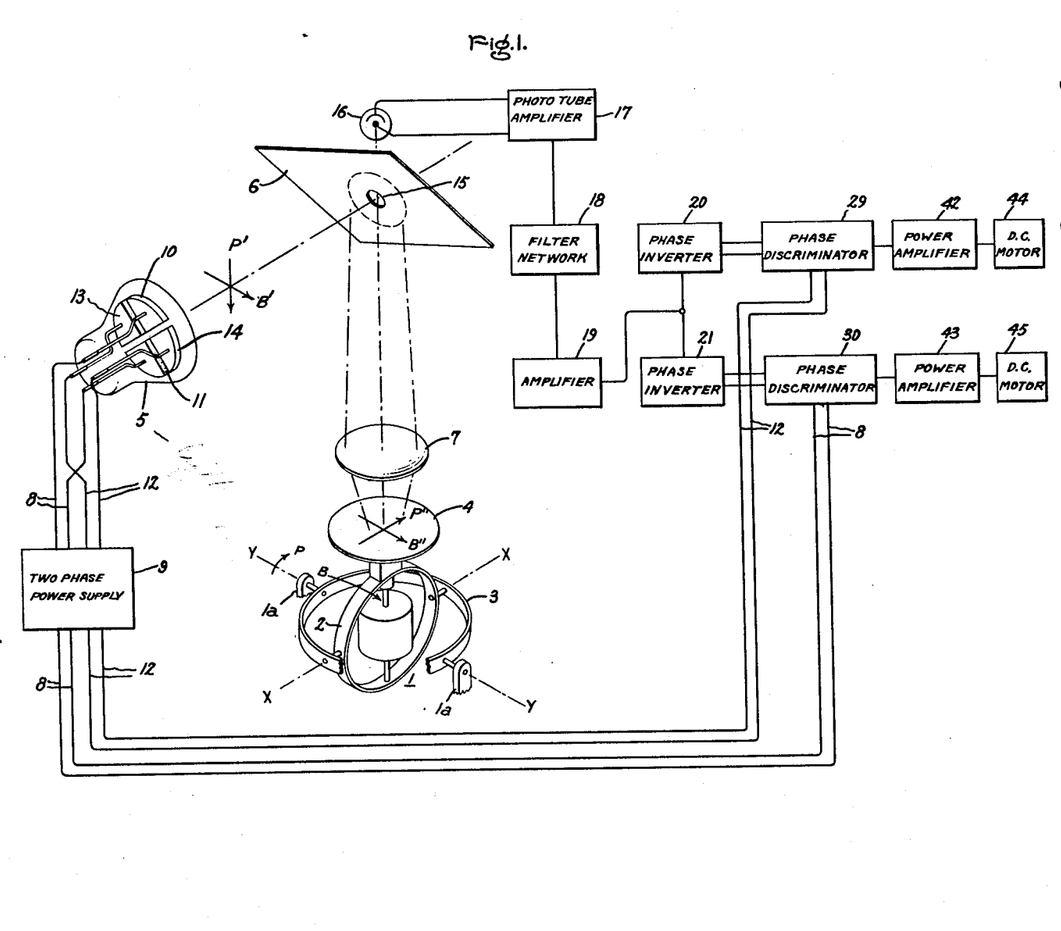
Fig. 1 is a diagrammatic sketch of a position indicating device embodying my invention in one form thereof.

Referring to Fig. 1, I have shown one embodiment of my invention as applied to measure the movement of an aircraft (not shown) relative to a vertical gyroscope 1 which is affixed thereon as in bearings 1a. The gyroscope rotor is mounted in a pair of gimbal rings 2 and 3 for two degrees of freedom, so that relative rotation of inner gimbal 2 indicates movement of the aircraft about its longitudinal or bank axis x—x, while relative rotation of outer gimbal 3 indicates movement of the aircraft about its transverse or pitch axis y—y. However, inner gimbal 2 in addition to rotating independently about the bank axis also moves about the pitch axis upon the rotation of outer gimbal 3, and thus the total movement of gimbal 2 is indicative of the movement of the aircraft about both the pitch and bank axes.

In order to determine the position of inner gimbal 2 relative to the two axes, there is employed, according to this invention, an indicating system which includes a flat reflecting surface or mirror 4 mounted on the inner gimbal. This movable mirror is employed to reflect a light beam which is produced by a fixed light source 5 and is directed thereon by fixed inclined reflecting surface or mirror 6, and a fixed lens 7. Since source 5, mirror 6 and lens 7 are all fixed in position in the aircraft the light beam projected onto mirror 4 is thus fixed in direction and thereby the direction in which it is reflected from mirror 4 is determined by the displacement of gimbal 2, i.e., the gyro rotor, about the pitch and bank axes.

The light source 5 is so constructed that the light beam produced by it appears at displaced points in an orbital path, or in a sense rotates about a fixed center point. This obviously could be accomplished by physically rotating a light source about a center point, but in the system of Fig. 1, it is accomplished by means of a new and improved stationary light source comprising, according to this invention, a multi-electrode inert gas glow lamp, such as the neon glow lamp 5 in which the light producing surface is divided into various equi-area segments or electrodes positioned in an orbital path around a center point. The multi-electrode lamp is energized from a polyphase source of power having half as many phases as the number of electrodes; and each phase is connected across a pair of oppositely disposed electrodes. Thus, in lamp 5, one phase 8 of the two-phase power supply 9 is connected across electrodes 10 and 11, while the second phase 12 is connected across electrodes 13 and 14.

Figure 4:
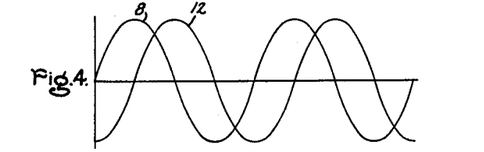
Fig. 4 is a plot showing the voltage waves of the synchronous electrical means used to energize the devices of Figs. 1 and 2.
Figure 5:
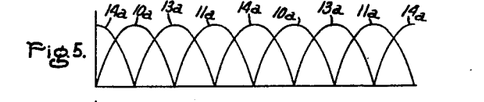
Fig. 5 is a wave plot of the light output of the light source incorporated in the device of Fig. 1.

Each electrode of each phase is, of course, energized negatively with respect to the other electrode of the phase for one half cycle of the applied phase voltage, and, as is characteristic of glow lamps, glows during that half-cycle only. In other words, each electrode of each phase glows for 180 electrical degrees of the phase voltage wave, but does not glow for the succeeding 180 electrical degrees of the wave. Since in a two-phase power supply, the two phases are separated by only 90 electrical degrees, the light-producing, or negative, periods of the electrodes of the different phases overlap each other. Assuming first that phase 12 lags phase 8 by 90 degrees as shown in Fig. 4, and further assuming that the conductors are connected to the lamp in the proper phase sequence to cause electrode 13 to go negative after electrode 10 but before electrode 11, and to cause electrode 14 to go negative after electrode 11 but before electrode 10, the various electrodes then glow in a sequential order as indicated in the light output pulse diagram of Fig. 5, the light pulses associated with each electrode being designated by the numeral associated with that electrode and the subscript *a*; for example, pulse 11*a* is produced by electrode 11. In other words, the various electrodes glow in a counterclockwise order, so that the light beam produced by source 5 is emitted successively and cyclically from displaced points in an orbital path, or in effect rotates about a center point, once for each complete cycle of power source 9. This causes the light impinging on mirror 4 to follow a similar orbital path.

Since as previously mentioned, source 5, mirror 6 and lens 7 are fixed to the aircraft, the direction in which the reflected light beam leaves mirror 4 is determined by the displacement of the gyro rotor relative to the axes of the aircraft. From mirror 4 the beam passes back through lens 7 and forms an image of light source 5 near the center of inclined mirror 6. This image, of course, follows an orbital path just as does the projected beam from the light producing surface. An aperture 15 is provided in mirror 6 and when the gimbal axes correspond with the axes of the aircraft the center of the orbital image path falls in the center of the aperture. In other words, when the gyro indicates that the aircraft is in level flight, the center of the orbital image followed by the image, i.e. by the reflected light beam, on mirror 6 coincides with the center of aperture 15. The diameter of the outer periphery of the orbital path is, however, greater than the diameter of the aperture, so that only a portion of the reflected light beam enters aperture 15.

The portion of the reflected light beam which does enter and pass through aperture 15 falls upon a light sensitive signal device, such as the photoelectric cell 16, positioned behind the mirror 6. Of course, as indicated in Fig. 1, a small amount of light passes from source 5 directly through aperture 15 without being reflected from mirror 6, but this direct light comes through at such an angle that it does not strike the light sensitive surface of the photoelectric cell, the output of the cell thus being determined entirely by the light reflected from mirror 4. When the aircraft is in level flight, the amount of light striking the photocell is essentially the same, no matter at which position the light beam happens to be in its orbital path. The output of the cell, however, does contain a small A.C. ripple due to the fact that the light emitted during the overlapping periods of energization of the electrodes is slightly greater than that emitted during the instant when only a single electrode is emitting light. This ripple frequency is four times the source frequency with a two-phase power supply, and thus, if a 400-cycle fundamental is used to energize the electrodes, as has been found best in actual practice, the output of the photo-cell contains a 1600-cycle ripple. If source 5 is energized from a two-phase source such as is described above, the output signal from the photocell is of the form shown in Fig. 6.

However, if the aircraft moves around either or both of the bank and pitch axes, the center of the orbital path of the reflected light, i.e. the orbital image path, no longer corresponds with the center of aperture 15. This permits more light to pass through the aperture when the beam is at one point in the orbital path than when it is at another point in the path, so that the output of the photocell is no longer of the form of Fig. 6. In other words, the amount of light striking the light sensitive surface of photocell 16 at any instant is changed by the movement of the aircraft relative to the gyro. The outer diameter of the orbital path of the reflected light beam is, as previously mentioned, greater than the diameter of aperture 15 in order to accentuate the effect of this movement. If the orbital path and the aperture are of the same diameter, movement of the path center away from the aperture center causes a decrease in the light striking the cell when the light beam is in the portion of its path lying in the direction of the movement of the path center. But it does not cause an increase in the light striking the cell when the light beam is in the portion of its path lying opposite to the direction of movement of the path center. However, if the orbital path diameter is greater than the aperture diameter, the amount of light striking the cell is considerably increased when the beam is in the aforesaid opposite position. Thus, it has been found advantageous to have the diameter of the orbital path approximately twice the diameter of the aperture.

Figures 6, 7:
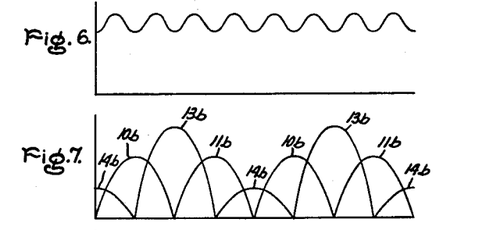
Fig. 6 is a plot of the electrical output of the photocell of Fig. 1 when the movable object is not displaced from the center or neutral position.
Figs. 7, 9 and 11 are plots of the light reaching the photocell when the movable object is diplaced in three different directions from the neutral position.

If the movement of the aircraft from level flight is such that outer gimbal 3 remains stationary in its fixed pivots 1*a* while inner gimbal 2 rotates to the right through a predetermined angle as indicated by arrow B in Fig. 1, i.e., the movement of the aircraft is about the bank axis only, then the reflected light beam is moved relative to aperture 15 so that more light reaches photocell 16 from electrode 13 than from electrode 14, but substantially the same amounts reach the photocell from electrodes 10 and 11 relative to each other. In other words, the reflected light beam is moved so that the effect is the same as if the fixed light source 5 were moved in a direction indicated by arrow B' while the mirror 4 were held steady. Such movement would obviously have the same effect on the respective positions of electrodes 10 and 11 relative to the center of the aperture but would have a dissimilar effect on the position of the electrodes 13 and 14. Thus, with a predetermined gyro movement in the direction indicated by B, and thereby a mirror movement in the direction B" the amount of light reaching photocell 16 from each of the glow lamp electrodes is as indicated in Fig. 7, the light from each electrode being designated by the numeral associated with that electrode and the subscript b. The fundamental or first harmonic of the output signal from the photoelectric cell then becomes of the wave shape shown in Fig. 8, having an A.C. portion with the same fundamental frequency as the two-phase source and in phase with phase 12. The A.C. portion is in phase with phase 12 since, as mentioned above, the gyro movement has no effect on the relative amounts of light received from electrodes energized from phase 8 whereas it has an appreciable effect on the relative amounts received from the electrodes energized from phase 12. The amplitude of this A.C. portion is dependent upon the amount of rotation of the gimbal and its phase is dependent upon the direction of rotation of the gimbal. If inner gimbal 2 rotates to the left rather than to the right, then the A.C. portion is displaced 180 degrees from the illustrated wave, as more light is then obtained from electrode 14 than from electrode 13. The A.C. portion is then, of course, 180 degrees out of phase with phase 12.

Figure 9:
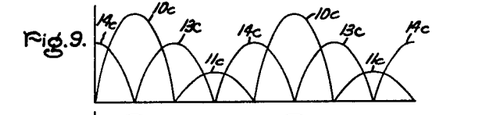
Figure 10:
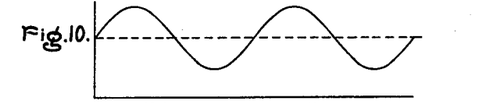

If the aircraft should move, however, from level flight so that inner gimbal 2 does not rotate within outer gimbal 3 but rather so that outer gimbal 3 moves to the right through a certain angle as indicated by the arrow P, i.e., the movement of the aircraft is about the pitch axis only, then more light reaches photocell 16 from electrode 10 than from electrode 11, and substantially the same amount from electrodes 13 and 14. In other words, the reflected light beam is moved so that the effect is the same as if the fixed light source 5 were moved in the direction of arrow P' while the mirror 4 were held steady. Such movement would obviously have the same effect on the respective positions of electrodes 13 and 14 relative to the center of the aperture but would have a dissimilar effect on the positions of electrodes 10 and 11. Thus with a predetermined gyro movement in the direction indicated by arrow P, and thereby a mirror movement in the direction p" the light reaching photocell 16 from each of the electrodes is indicated by the pulse diagram of Fig. 9, the pulses being designated by the numerals of the electrodes producing them and the subscript c; and the wave shape of the fundamental or first harmonic of the output of the photocell is indicated in Fig. 10. The A.C. portion of this output is of the same frequency as the two-phase source 9 and is directly in phase with phase 8. The A.C. portion is in phase with phase 8 since, as mentioned above, the gyro movement has no effect on the relative amounts of light received from the electrodes energized from phase 12, whereas it has an appreciable effect on the relative amounts received from the electrodes energized from phase 8. If gimbal 3 should rotate to the left rather than to the right, then the A.C. portion of the outfit would be displaced 180 degrees so as to be directly out of phase with phase 8. Thus, displacement of the aircraft around either the pitch or bank axes results in an A.C. output signal from the photocell whose magnitude is dependent upon the amount of displacement and whose phase is dependent upon the direction of displacement.

Figure 11:
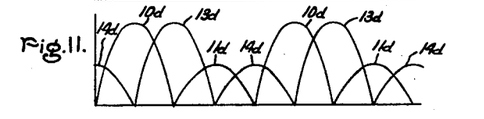
Figure 12:
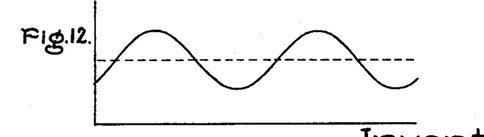

If the aircraft is displaced about both axes at once, then more light reaches the photocell from two adjacent electrodes and less from the other two adjacent electrodes, and this results in an A.C. signal which lies in time phase between the signals due to independent movement about the axes. For example, if inner gimbal 2 moves to the right through a certain angle, and outer gimbal 3 moves simultaneously to the right through the same angle the photocell then receives more light from electrodes 10 and 13 than from electrodes 11 and 14, as indicated in Fig. 11. In Fig. 11 the pulse from each electrode is designated by the numeral associated with that electrode and the letter "d." The fundamental or first harmonic of the output of the photocell, as shown in Fig. 12, then has an A.C. portion having the same frequency as source 9 and having a time phase leading phase 8 but lagging phase 12. Moreover, when the displacement around one axis is greater than the displacement around the other axis, the resultant A.C. wave then moves nearer in time phase to the wave due to independent movement around the axis of greater displacement than to the wave due to independent movement around the axis of lesser displacement, i.e., nearer to one phase of source 9 than to the other. In other words, considering the output signal to be made up of two 90-degree components, each due to movement in a predetermined direction about one axis, the total output signal then contains more of one 90-degree component than of the other, and thereby is nearer in time phase to the greater component. Of course, the greater are these 90-degree components in actual magnitude as compared to their magnitudes relative to each other, the greater is the magnitude of the total wave. Therefore, no matter what the displacement of the gyro may be, the A.C. signal output of the photocell as made up of the various 90-degree components is indicative of the displacement of the gyro about both axes, its time phase being indicative of the overall angle of displacement and its magnitude being indicative of the amount of displacement.

There are various photo-sensitive circuits or systems which may be used to obtain an indication of the gyro position from the intelligence contained in the A.C. portion of the photocell output signal. One such system, namely a phase discriminating circuit, is illustrated in block form in Fig. 1. In that circuit the output of the photocell is fed to a photocell amplifier 17, and thence to a filter network 18, which removes the ripple frequency and any non-sinusoidal components in the A.C. intelligence wave, leaving substantially only the desired fundamental of the wave. The filtered signal is then amplified in an amplifier 19 of any well known type, and is passed to two phase inverters 20 and 21. Each of these inverters 20 and 21 produces two output signals, one of which is identical in both phase and wave shape with the input signal, and the other of which is identical in wave shape but displaced 180 degrees, i.e., inverted, from the input signal.

Figure 3:
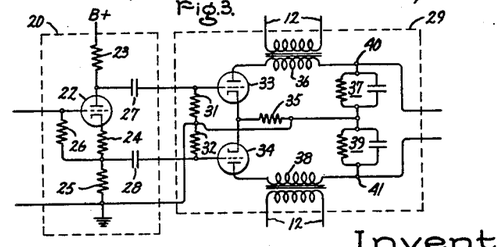
Fig. 3 is a schematic diagram of a phase inverter and phase discriminator circuit suitable for use with the devices of Figs. 1 and 2.

There are various phase inverter circuits which may be employed to obtain the desired signals, and one such circuit is illustrated in Fig. 3. The illustrated circuit comprises an electron discharge device, such as the vacuum tube triode 22, connected serially across a grounded D.C. power supply with an anode load resistor 23, a cathode biasing resistor 24, and a cathode load resistor 25. The input signal from amplifier 19 is applied between the control electrode or grid of triode 22 and ground with a grid return resistor 26 being employed to complete the input circuit. As the input signal drives the control grid alternatively more negative and more positive, an output signal having an A.C. component identical in wave shape and phase with the input signal is derived across the anode of tube 22 and ground, while a signal having an A.C. component inverted 180 degrees therefrom is derived between the ungrounded end of resistor 25 and ground. In order to remove the D.C. components from these output signals leaving only the desired A.C. intelligence signals, coupling capacitors 27 and 28 are connected respectively in the ungrounded output leads.

From the phase inverters 20 and 21, the output signals are applied to similar phase discriminating circuits, the signals from inverter 20 being fed to phase discriminator 29 and the signals from inverter 21 being fed to phase discriminator 30. In discriminator 29, the input signals are compared with a reference voltage comprising phase 12 of power supply 9 to obtain a D.C. voltage having a polarity dependent upon the direction of displacement of the aircraft, about the bank axis and a magnitude dependent upon the amount of the displacement; while in discriminator 30, the input signals are compared with a reference voltage comprising phase 8 of power supply 9 to obtain a D.C. voltage having a polarity dependent upon the direction of displacement of the aircraft about the pitch axis and a magnitude dependent upon the amount of such displacement. In other words, in the discriminator circuits, the total intelligence contained in the magnitude and time phase of the photocell output signal is broken down into rectangular components by comparing the output signal with reference voltages fixed in time phase and displaced electrically 90 degrees from each other.

There are various phase discriminator circuits available for performing such a function, and a suitable half-wave discriminator 29 with a double-ended input is illustrated in Fig. 3. In the illustrated circuit, the two opposite output signals from the associated phase inverter 20 are applied respectively through coupling capacitors 27 and 28 to grid biasing resistors 31 and 32, and thereby to the control electrodes or grids of a pair of electron discharge devices, such as the vacuum tube triodes 33 and 34. The junction of resistors 32 and 33 is grounded and tied to the cathode of tubes 33 and 34 through a cathode follower resistor 35 in order to complete the input circuit.

Each of the discriminator tubes 33 and 34 is connected in a closed plate circuit including in series circuit relation the secondary of an energizing transformer, an identical filter network, and the common cathode follower 35; and it is from across the two filter networks that the output of the discriminator is taken. More specifically, the plate circuit of tube 33 comprises a transformer secondary 36, a filter network 37 including a resistor and a capacitor connected in parallel, and the common cathode follower 35, while the plate circuit of tube 34 comprises a transformer secondary 38, a filter network 39 including a resistor and a capacitor connected in parallel, and the common cathode follower 35. Transformer secondaries 36 and 38 produce identical voltages and are connected in their respective plate circuits so that the plate voltages on tubes 33 and 34 are equal in phase as well as in magnitude. In discriminator 29 phase 12 is applied to the transformer primaries associated with secondaries 36 and 38 so that the plate or reference voltage is the wave of phase 12 while in discriminator 30 phase 8 is applied to the transformer primaries so that the plate voltage is the wave of phase 8.

Since the alternating plate voltages on tubes 33 and 34 are equal, substantially identical currents then flow in both plate circuits during the conducting half-cycles of the tubes when there is no signal applied to the control electrodes from the phase inverter, as is the case when the axes of the gyro and the aircraft coincide, i.e., when the center of the orbital light path and the center of aperture 16 coincide. The direction of current flow in the plate circuits is the same through the common cathode resistor 35 but is in a sense opposite through the filter networks. More specifically, the current flow through network 37 is from resistor 35 to transformer secondary 36, while the flow through network 39 is from resistor 35 to transformer secondary 38. Therefore, with no input signal so that there are identical currents through the networks, the same voltage appears at the ungrounded ends or output terminals 40 and 41 of the filter networks. However, this equal voltage condition does not exist if for any reason the current in one plate circuit is greater than the current in the other plate circuit. With unequal currents, the voltages at terminals 40 and 41 are different, and thus in effect an output signal appears between the two terminals. The polarity of the output signal depends upon which plate circuit is conducting more current, while the magnitude of the signal depends upon the magnitude of the current differential between the two circuits.

The magnitude of the two plate currents and thus the output of the discriminator itself are determined by the action of the control electrodes of tubes 33 and 34, which electrodes are, of course, controlled by the input signals from phase inverting network 20. When the two input signal waves are displaced respectively 90 and 270 degrees from the plate voltage wave, i.e. from phase 12, the effect of each input signal upon its associated plate circuit is the same when taken over the entire conducting half-cycle of the plate wave. In other words, with such a displacement between the input signals and the plate wave, both tubes conduct the same total amount of plate current during the conducting half-cycle of the plate wave. Since the effect of the filter network in each plate circuit is to substantially remove any A.C. components in the plate current, the two plate currents therefore are substantially equal length, equal magnitude D.C. pulses. With equal length and magnitude currents, there are equal voltage drops across the filter networks and thus, considering the entire conducting half-cycle, no output signal from the discriminator.

However, if the input control signals are displaced in either direction from this 90 and 270 degree phase relationship to the common plate voltage wave, one plate circuit then conducts more current than the other due to the action of the input signals on the control electrodes, and an output signal appears between terminals 40 and 41. If the input signals shift in one direction, the one plate circuit carries the greater current, whereas if they shift in the other direction, the other plate circuit carries the greater current. In either case, the amount of current in both circuits is determined both by the size of the phase shift of the input signals relative to the plate wave, and by the absolute magnitude of the input signals. Thus, the polarity of the output signal from the discriminator depends upon the direction of the phase shift, and the magnitude of the signal depends upon the amount of the phase shift and upon the magnitude of the input signal. In other words, the discriminator produces a D.C. signal whose magnitude and polarity are determined by the magnitude and phase of the A.C. input signal.

Thus, to make the output of discriminator 29 indicative of the displacement of the aircraft around the bank axis, the transformer primaries associated with transformer secondaries 36 and 38 are excited, as previously mentioned, with the same phase 12 as that used to excite the glow lamp electrodes 13 and 14. Then any movement of the aircraft around the bank axis, or actually of the aircraft relative to the gyro, since it results in the A.C. portion of the photocell output being either in phase or 180 degrees out of phase with the wave of phase 12 causes input signals respectively in phase and 180 degrees out of phase with the plate voltage to be applied to the control electrodes of the two tubes, so that an output signal is produced. Moreover, any aircraft movement having a component of direction along that axis results in an output signal being produced by the discriminator, since any component along the axis causes the phase between the input signals and the plate wave to deviate from the null 90 and 270 degree relationship. However, aircraft movement at right angles to the bank axis, i.e., movement around the pitch axis, since it results in the A.C. portion of the photocell output being either 90 degrees or 270 degrees displaced from the wave of phase 12 does not cause the discriminator to produce a signal, because then the input signals from the phase inverter are 90 degrees and 270 degrees out of phase with the plate voltage wave.

Discriminator 30 may be identical to discriminator 29, but in order to make it sensitive to the movement of the aircraft around the pitch axis, its plate circuits are energized with the voltage having the same phase as the voltage energizing the electrodes 10 and 11, i.e., the plate circuits are energized with phase 8 of source 9. In other words, the one discriminator is energized with one phase of the two-phase lamp excitation voltage, while the other discriminator is energized with the other phase. One discriminator thus produces a D.C. signal in response to any displacement of the aircraft about one of the gyro axes, while the other discriminator produces a D.C. signal in response to any displacement of the aircraft about the axis perpendicular thereto.

The outputs of the discriminators 29 and 30 are fed respectively through power amplifiers 42 and 43 to D.C. motors 44 and 45, and the D.C. motors may be employed to control either indicating equipment, or voltage sources, such as selsyn generators, in an automatic pilot system. For example, if a position indicating device embodying this invention were used with a vertical gyro in an autopilot, the motor energized from one discriminator could be used to control a voltage source in the aileron channel, and the motor energized from the other discriminator could be used to control a voltage source in the elevator channel.

Figure 2:
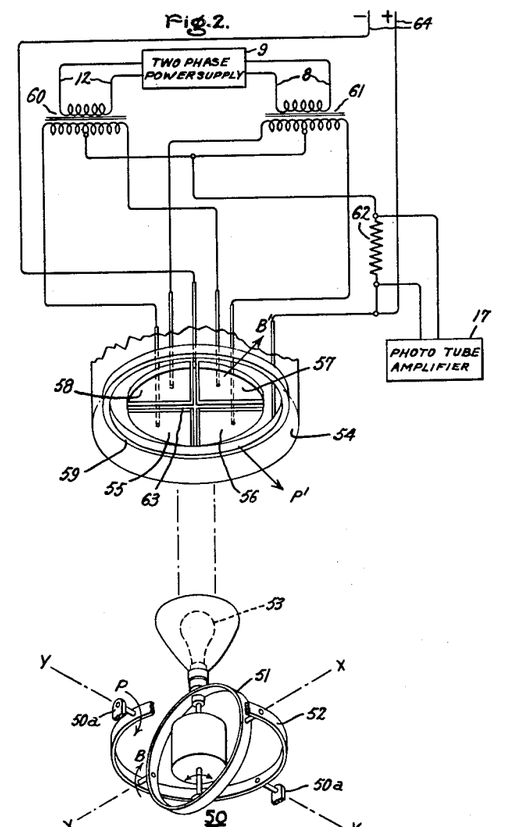
Fig. 2 is a diagrammatic sketch showing a position indicating device embodying my invention in a second form thereof.

Referring now to Fig. 2, I have illustrated therein an alternate embodiment of my invention as applied to indicate the position of a vertical gyroscope 50 relative to the bank and pitch axes of the aircraft (not shown) in which it is positioned by means of bearings 50a, the gyroscope rotor being mounted in gimbal rings 51 and 52 for 2 degrees of freedom. In certain generic aspects of course the systems of Figs. 1 and 2 are similar, and to clarify the disclosure like parts have been assigned the same reference numerals. Mounted on the inner gimbal 51 of gyro 50 is a lamp 53 which produces a steady cylindrical light beam, and positioned above gyro 50 so as to intercept this light beam is a photoelectric device 54. According to my invention, device 54 contains a photo-sensitive surface which is divided into a plurality of segments, these segments being positioned in an orbital path around a center point. Thus, in the illustrated device, the photosensitive surface comprises equi-area segments or cathodes 55, 56, 57 and 58. These cathodes are successively made negative with respect to an annular anode 59 and, if struck by light when negative to anode 59, emit electrons which are then collected by anode 59. Although the cathodes also tend to emit electrons if struck by light when positive with respect to anode 59, no electron current can then flow to anode 59 due to its negative charge.

In order to so energize the cathodes and the anode, a polyphase voltage source, such as the two-phase power supply 9, is employed. Each phase of power supply 9 is connected across the primary winding of a transformer having a midtapped secondary winding, phase 8 being connected across the primary of transformer 60, and phase 12 being connected across the primary of transformer 61. The midtaps of the two secondary windings are joined together and are connected to anode 59 through an output resistor 62, while the ends of the windings are connected directly to the various cathodes. More specifically, the two ends of one secondary are connected to cathodes 55 and 57, while the ends of the other secondary are connected to cathodes 56 and 58. Thus, when transformers 60 and 61 are energized with the alternating voltage waves shown in Fig. 4, first cathode 55, next cathode 56, then cathode 57, and finally cathode 58 become negative with respect to anode 59. In other words, the cathodes are made negative sequentially so that the photosensitive surface, in effect, becomes successively actuated at displaced points lying in an orbital path. Of course, when cathode 55 goes negative with respect to anode 59, it also goes negative with respect to cathode 57, whereby there is a tendency for electrons to flow from cathode 55 to cathode 57, thus bypassing the load resistor 62. The same effect also exists, but in reverse direction when cathode 57 goes negative with respect to cathode 55, and obviously exists in the same manner between cathodes 56 and 58. To prevent the undesirable electron flow between the cathodes, a shield 63 is placed between the cathodes and is biased negatively from a D.C. power supply 64.

Photoelectric device 54 is positioned so that the center of the light beam from light source 53 and the center of the segmented photosensitive surface coincide when the axes of the aircraft and the gyroscope correspond, i.e., when the gyroscope is in its neutral or null position as illustrated. The cross-sectional area of the cylindrical light beam is, however, less than the area of the photosensitive surface, so that only the parts of the cathode adjacent the center point are illuminated. In other words, as the photosensitive surface becomes successively light sensitive at displaced areas in an orbital path, the diameter of the path is greater than the diameter of the light beam, and only a portion of each of the displaced areas produces current.

As the instantaneously photosensitive portion of the surface appears at the displaced areas, an output wave is produced similar to that illustrated in Fig. 6 for photocell 16. The overlapping of the sensitive periods of the cathode results in the output of device 54 containing a fourth harmonic ripple frequency, just as the overlapping of the illuminated periods of the electrodes of lamp 5 results in the output of device 16 containing such a frequency. However, as gyro 50 is displaced around its axes relative to the aircraft, equal areas are no longer illuminated on all the cathodes of device 54. Rather, the different cathodes are now illuminated differently, depending upon the direction of displacement of the gyro. Thus, as the cathodes are sequentially made sensitive by the two-phase energization voltage, the output pulses vary from one cathode to the next, and a signal having an A.C. component of the frequency of source 9 appears across load resistor 62.

The phase of this A.C. components depends upon the direction of the gyro displacement and its magnitude depends upon the amount of gyro displacement. The A.C. signal obtained from device 54 upon a certain displacement of gyro 50 is thus identical with that obtained from photocell 16 upon the same displacement of gyro 1. For example, if inner gimbal 51 moves to the right around bank axis x—x, as indicated by the arrow B, while outer gimbal 52 remains stationary, the light beam moves on the photosensitive surface as indicated by arrow B'. This causes cathode 57 to produce a greater signal than cathode 55, while cathode 56 still produces the same magnitude signal as cathode 58. Since cathodes 57 and 55 are energized from phase 12 and cathodes 56 and 58 are energized from phase 8, this results in the output signal from the cell being in time phase with phase 12. Conversely, a movement of inner gimbal 51 to the left causes cell 54 to produce an output signal 180 degrees out of phase with phase 12.

Similarly, if inner gimbal 51 remains stationary while outer gimbal 52 moves to the right around pitch axis Y—Y, as indicated by arrow P, then the light beam moves relative to cell 54, as indicated by the arrow P'. This movement causes the cell to produce an output directly in time phase with phase 8. Moreover, a movement of gimbal 52 in the opposite direction results in a photocell output 180 degrees out of phase with phase 8.

As with gyro 1, a movement of the gyro about both axes at once results in a signal lying in time phase between phases 8 and 12. In any case the A.C. signal from device 54 can then be fed into the same sort of circuit as that shown in Fig. 1, in order to obtain two D.C. signals, one indicative of the movement of the aircraft about the pitch axis and the other indicative of its movement around the bank axis. Since the same circuits may be used with both of the illustrated embodiments of the invention, only the first or phototube amplification stage of the circuit is shown in Fig. 3.

In addition to the illustrated phase discriminator circuit for utilizing the information contained in the phase and magnitude of the photocell output, there are, of course, other phase sensitive systems which may be employed for that purpose. For example, the output of the photocell after having been passed through various filtering and amplification stages may be used to control a pair of two phase motors. These motors contain two windings, one displaced 90 degrees electrically from the other, and the photocell output is applied to one winding of each motor. The other winding of each motor is, however, excited by a separate phase of the two phase power supply used in producing the photocell output, for example power supply 9 in Figs. 1 and 2. Thus, if power supply 9 were used, one motor would have phase 8 and the photocell output impressed respectively on its two windings and the other motor would have phase 12 and the photocell output impressed respectivelyy on its two windings.

As is well known to the art, the output of a two phase motor is dependent upon the phase angle between the two voltages impressed on its two windings and upon the magnitudes of these voltages. It is characteristic of such motors that when the voltages applied to the two windings are displaced zero degrees or 180 degrees, there is then not output torque available. In other words, no rotation of the motor will occur. However, at any other phase angle between the winding voltages, there is an output torque, the maximum torque occurring, for constant magnitude voltages, when the voltages are displaced in phase 90 degrees or 270 degrees. The direction of the torque and thus of the motor rotation depends upon whether the phase angle between the windings lies between zero and 180 degrees, or between 180 degrees and 360 degrees. Assuming that the control voltage from power supply 9 remains constant in phase and magnitude, the output of each of the above motors then depends directly upon the phase angle and the magnitude of the photocell output.

Figure 8:
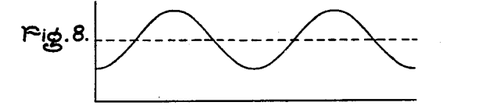
Figs. 8, 10 and 12 are plots of the electrical output of the photocell when it receives respectively the light pulses shown in Figs. 7, 9 and 11.

As previously mentioned, when the gyro is displaced about one axis only, the photocell output is directly in phase or 180 degrees out of phase with one of the control voltages, depending upon the direction of gyro displacement. Since the control voltages or phases are displaced 90 degrees from each other, the photocell output in then 90 degrees or 270 degrees displaced from the other control voltage. Conversely, when the gyro is displaced about the other axis only, the relationship shifts 90 degrees so that the photocell output is directly in phase or 180 degrees out of phase with the second control voltage and 90 degrees or 270 degrees out of phase with the first control voltage. Thus, with a photocell output such as is shown in Fig. 8, one motor would rotate, whereas with an output as shown in Fig. 10, the other motor would rotate. The speed of rotation in either case depends upon the magnitude of the photocell output. Of course, the gyro may be displaced about both axes at once so as to produce an output such as is shown in Fig. 12, and upon such an occurrence a rotation of both motors is the result. In this latter case, the rotation of each motor is proportional to the component of photocell output in quadrature with its control voltage. In other words, the rotation of each motor is dependent upon one right angle component of the photocell output and thereby is proportional to the movement of the gyro relative to one axis. Thus, as with D.C. motors 44 and 45, one of the two phase motors could be used to control a signal source in the aileron channel of an autopilot and the other two phase motor could be used to control a signal source in the elevator channel. It should thus be obvious that my invention is not limited to such a phase sensitive system as is illustrated in the diagrams, but may be used with other phase sensitive systems to obtain equally good results.

Although I have shown and described my invention with reference to gyroscope applications, it should be understood that the invention is not limited to such applications. For example, position indicating devices embodying this invention could be used in industrial control equipment for following contours of objects or for following light lines on dark backgrounds. In fact, position indicating devices built according to this invention can be used in almost any application where it is desired to determine the displacement of an object with respect to a pair of perpendicular axes, whether the displacement be angular displacement around the axes or lateral displacement in a plane including both axes. Thus, while in accordance with the patent statutes there have been illustrated and described what are at present considered to be the preferred embodiments of this invention, it will be obvious to those skilled in the art that numerous modifications and alterations may be made therein, and it is, therefore, intended in the appended claims to cover all such modifications and alterations as fall within the true spirit and scope of this invention.

This application is a continuation of application Serial No. 244,388, filed August 30, 1951, for "Position Indicating Device" in the name of the present inventor and assigned to the same assignee as the present invention.

What is claimed as new and desired to be secured by Letters Patent of the United States is:

1. In a device for indicating the position of an object relative to a neutral position, a photoelectric cell having a light sensitive surface, a light source having a light producing surface divided into a plurality of segments arranged in a two dimensional orbital path, means successively and cyclically energizing said segments by two phase displaced electrical signals to emit a pulsating light beam following a two dimensional orbital path, means for directing said light beam in a direction controlled by said object to successively and cyclically activate said light sensitive surface to produce electrical signals, and means controlled by the movement of said object for varying the relative portion of said light beam activating said light sensitive surface and thereby the relative magnitude of said signals in accordance with said movement, the relative portion of said light beam activating said light sensitive surface and thereby the relative magnitudes of said signals being fixed when said object is in said neutral position.

2. A position indicating device for indicating the position of an object mounted for movement about two angularly displaced axes relative to a predetermined position of said object comprising; a light source having an electrode for generating a movable light beam, said light beam being moved in response to movement of said object, a light sensitive device having an electrode, one of said electrodes being divided into a plurality of segments, a polyphase source of power for successively energizing said electrode segments at displaced points lying in an orbital path, said movable light beam activating said light sensitive device so that said light sensitive device produces signals proportional to movement of said object and means for comparing said signals with said polyphase source to indicate the movement of said object from a predetermined position.

3. In a device for indicating the position of an object relative to a neutral position, a photoelectric cell having a light sensitive surface, a light source having a light producing surface divided into a plurality of segments arranged in an orbital path, means successively and cyclically energizing said segments to emit light pulses, means for directing said light pulses onto said light sensitive surface to successively and cyclically activate said light sensitive surface to produce electrical signals, means controlled by movement of said object for varying the relative portion of said light pulses activating said light sensitive surface and thereby the relative magnitude of said signals in accordance with said movement, the relative portion of said light pulses activating said light sensitive surface and thereby the relative magnitudes of said signals being fixed when said object is in said neutral position, and a pair of phase discriminator circuits each provided with a different reference signal and each connected to compare the output of said photocell with its said reference signal.

4. A device for determining the displacement of an object rotatable about two axes from a prearranged neutral position comprising a member having a light reflecting surface provided with an aperture therethrough, a photoelectric cell positioned behind said member to receive light through said aperture, a light source for successively illuminating displaced points in a two dimensional orbital path on said surface at a predetermined frequency, means controlled by the position of said object for varying the position of the center of said orbital path relative to said aperture to cause the light received by said cell at any instant to be dependent upon the resulting displacement of said object from said neutral position about said two axes and upon the portion of said path being illuminated at said instance, the center of said orbital path and said aperture coinciding when said object is in said neutral position whereby upon the displacement of said object from said neutral position about either axis said cell produces an electrical output containing an alternating current component having a resulting phase angle dependent upon the angle of said resulting displacement of said object and an amplitude dependent upon the magnitude of said resulting displacement.

5. A device for determining the displacement of an object from a prearranged neutral position comprising a member having a light reflecting surface and provided with an aperture therethrough, a photoelectric cell positioned behind said surface to receive light through said aperture, a light source for successively illuminating displaced points in an orbital path on said surface at a predetermined frequency, means controlled by the position of said object for varying the position of the center of said orbital path relative to said aperture to cause the light received by said cell at any instant to be dependent upon the displacement of said object from said neutral position and upon the portion of said path being illuminated at said instant, the center of said orbital path and said aperture coinciding when said object is in said neutral position whereby upon the displacement of said object from said neutral position said cell produces an electrical output containing an alternating current component having a phase angle dependent upon the angle of displacement of said object and an amplitude dependent upon the magnitude of displacement, and a pair of phase discriminator circuits, each connected to compare the output of said cell with a different alternating current control voltage to produce a D.C. signal, with each of said control voltages having a frequency correlated with said predetermined frequency.

6. Means for determining the position of one object rotatable about two angularly displaced axes with respect to a second object comprising; a source for generating an orbital light pattern in a direction controlled by the resulting position of said first object, an optico-electrical converter mounted in fixed relation to said second object and adapted to receive differing portions of said orbital light pattern in accordance with the relative position of said first object about said two angularly displaced axes, means associated with said converter and source for enabling the electrical transformation of each adjoining portion of the orbital light pattern in time sequence, said means including electrical comparing means responsive to said converter and to a pair of phase displaced reference signals for determining the portions of the orbital light pattern received by the converter and thereby determining the relative position of said first object about said two perpendicular axes.

7. Means for determining the position of one object rotatable about two perpendicular axes with respect to a second object comprising; a source for generating an orbital light pattern in a direction controlled by the first object, an optico-electrical converter mounted in fixed relation to said second object and adapted to receive differing portions of said orbital light pattern in accordance with the relative position of said first object about said two perpendicular axes, means associated with said converter and source for enabling the electrical transformation of adjoining quadrants of the orbital light pattern in time sequence, said means including a pair of electrical comparing means, each responsive to said converter and to a different one of two phase displaced reference signals, for determining the portions of adjoining quadrants of the orbital light pattern received by the converter and thereby determining the relative positions of said first and second objects with respect to said two perpendicular axes.

8. In a system for determining the position of one object rotatable about two axes referenced to a second object, a light responsive electric cell having a light sensitive surface, a light source having a light producing surface divided into a plurality of displaced segments arranged in an orbital path, means successively and cyclically energizing adjacent segments by two phase displaced electrical signals to emit a pulsating light beam following an orbital path, means for directing said light beam in a direction controlled by said first object to cyclically activate said light sensitive surface by different portions of said orbital light path dependent upon the resultant position of said first object about said two axes, and a comparator energized by said two phase displaced electrical signals and responsive to said electric cell for generating two electrical signals each proportional to the relative rotative position of said first object about a different one of said two axes.

9. In a device for indicating the position of an object rotatable about two axes relative to a predetermined position, a photoelectric cell having a light sensitive surface, a movable source generating a light beam, a polyphase source of power for successively and cyclically energizing displaced areas of said light sensitive surface lying in a two dimensional orbital path, said light beam activating said displaced areas of said light sensitive surface to produce electrical signals, the relative sizes of said areas and thereby the relative magnitudes of said signals in a single cycle being substantially fixed when said object is in said predetermined position, and said movable source being controlled by the movement of said object for varying the relative sizes of said areas and thereby the relative magnitudes of said signals in accordance with said movement.

10. In a device for indicating the position of an object relative to a neutral position, a photoelectric cell having a light sensitive surface divided into a plurality of segments arranged in an orbital path, a movable source generating a light beam, a polyphase source of power for successively and cyclically energizing said segments, said light beam activating said light sensitive surface to produce electrical signals, only a portion of each of said segments being activated and the relative sizes of the portions being fixed when said object is in said neutral position to cause the relative magnitudes of said signals to be fixed for said neutral position, and said movable source being controlled by the movement of said object for varying the relative sizes of said activated portions and thereby the relative magnitudes of said signals in accordance with said movement.

(References on following page)

References Cited in the file of this patent

UNITED STATES PATENTS

| | | | |
|---|---|---|---|
| 1,016,240 | Alexieff | Jan. 30, | 1912 |
| 1,999,646 | Wittkuhns | Apr. 30, | 1935 |
| 2,065,421 | Bernarde | Dec. 22, | 1936 |
| 2,132,676 | Chance | Oct. 11, | 1938 |
| 2,403,387 | McLennan | July 2, | 1946 |
| 2,447,344 | Kliever | Aug. 17, | 1948 |
| 2,463,362 | Doll | Mar. 1, | 1949 |
| 2,513,367 | Scott | July 4, | 1950 |
| 2,608,094 | Best | Aug. 26, | 1952 |
| 2,762,123 | Schultz et al. | Sept. 11, | 1956 |